United States Patent [19]
Andersen et al.

[11] Patent Number: 5,974,453
[45] Date of Patent: Oct. 26, 1999

[54] METHOD AND APPARATUS FOR TRANSLATING A STATIC IDENTIFIER INCLUDING A TELEPHONE NUMBER INTO A DYNAMICALLY ASSIGNED NETWORK ADDRESS

[75] Inventors: David B. Andersen; Dirk J. Brandewie, both of Hillsboro, Oreg.

[73] Assignee: Intel Corporation, Santa Clara, Calif.

[21] Appl. No.: 08/947,112

[22] Filed: Oct. 8, 1997

[51] Int. Cl.$^6$ .......................... G06F 15/16; G06F 15/177
[52] U.S. Cl. ........................... 709/220; 709/228
[58] Field of Search .......................... 395/200.5–200.52, 395/200.58, 651–653; 709/220–222, 228; 713/1–3

[56] References Cited

U.S. PATENT DOCUMENTS

| | | | |
|---|---|---|---|
| 5,434,974 | 7/1995 | Loucks et al. | 707/101 |
| 5,664,185 | 9/1997 | Landfield et al. | 707/104 |
| 5,777,989 | 7/1998 | McGarvey | 370/254 |
| 5,790,548 | 8/1998 | Sistanizadeh et al. | 370/401 |
| 5,812,776 | 9/1998 | Gifford | 395/200.47 |
| 5,812,819 | 9/1998 | Rodwin et al. | 395/500 |

OTHER PUBLICATIONS

Mockapetris, P., "Domain Names—Concepts and Facilities," RFC 1034, Network Working Group, pp. 1–55, Nov. 1987.

Mockapetris, P., "Domain Names—Implementation and Specification," RFC 1035, Network Working Group, pp. 1–55, Nov. 1987.

Mockapetris, P., "DNS Encoding of Network Names and Other Types," RFC 1101, Network Working Group, pp. 1–14, Apr. 1989.

Droms, R., "Dynamic Host Configuration Protocol," RFC 1531, Network Working Group, pp. 1–39, Oct. 1993.

Sinha, P., "Distributed Operating Systems: Concepts and Design," IEEE Press, pp. 1–16, Dec. 1996.

Computer Dictionary, 3rd ed., Microsoft Press, p. 155 & 158, 1997.

*Primary Examiner*—Zarni Maung
*Assistant Examiner*—Andrew Caldwell
*Attorney, Agent, or Firm*—Jeffrey S. Draeger

[57] ABSTRACT

A method and apparatus for translating a static identifier into a dynamically assigned network address. In one embodiment, a dynamic database address is used to access a dynamic database. A static identifier corresponding to the device to be contacted is provided, and the dynamic database returns an appropriate dynamically assigned network address corresponding to the static identifier. A static identifier includes a telephone number arranged in a predetermined format to which a static portion is appended. An Internet Domain Name System (DNS) domain may be used as the static appended portion. This translation of a static identifier into a dynamically assigned network address may be applied to DNS servers. A system of the present invention includes a network, an intermittently connected device, and a dynamic database server. The device has a static identifier and an assigned network address. The dynamic database stores the static identifier and the assigned network address when the intermittently connected device sends a log on request to the database server. The intermittently connected device and the dynamic database server may communicate using the Dynamic Host Configuration Protocol (DHCP).

27 Claims, 5 Drawing Sheets

METHOD AND APPARATUS FOR TRANSLATING A STATIC IDENTIFIER INCLUDING A TELEPHONE NUMBER INTO A DYNAMICALLY ASSIGNED NETWORK ADDRESS

FIELD OF THE INVENTION

The present invention pertains to the field of communication between computers over the a network such as the Internet. More specifically, the present invention pertains to a method for providing static names for devices which are dynamically assigned network addresses upon connection to the network.

BACKGROUND

In order for two computers to communicate using the Internet, a calling computer must know or be able to discover an Internet Protocol (IP) address of a callee. The Domain Name System (DNS) facilitates this process by resolving a "friendly name" (i.e., a recognizable set of characters rather than a numerical IP address) into a corresponding IP address. Thus, human users generally do not need to know or even see the underlying IP address associated with computers connected to the Internet.

Many Internet users access the network using a personal computer (PC) and an Internet Service Provider (ISP). It is a common practice for an ISP to dynamically assign an IP address which is valid only during the interval in which the PC is connected to the ISP. Furthermore, there is no static identifier (e.g., a friendly name) associated with the computer and available through DNS. Accordingly, in many instances, users do not know what their own dynamically assigned Internet address is, nor do they have a DNS name assigned to their computer. As a result, most Internet users are unable to supply any static, unique identifier that can be repeatedly used to establish a communications session with their computer via the Internet.

A mechanism referred to as User Location Service (ULS) provides one solution to this problem. ULS includes a dynamic directory containing records that map some unique user identifier to a currently assigned IP address. ULS places no restriction (other than uniqueness) on the selected friendly name. Individual computers are responsible for contacting and logging in to a ULS server. The act of logging in causes a new ULS record to be created. The ULS record is deleted when the computer logs out of ULS or fails to continue to refresh its record.

Two significant problems with ULS are its inability to scale and the completely non-standard way in which friendly names are resolved to IP addresses. Using non-standard name resolution techniques prevents pre-existing applications from accessing intermittently connected devices in an automated manner. For example, a ULS identifier string cannot be resolved by DNS or by an individual's web browser software. Existing applications such as web browsers are typically only able to access resources using local file names, actual IP addresses, and DNS names. To contact intermittently connected devices using prior art techniques, the particular ULS server containing the address must be contacted to resolve the address. Thus, ULS registered devices are typically not directly accessible using many existing applications.

The inability to scale well presents even greater problems. A computer wishing to resolve a ULS name has no way of knowing which ULS site may currently contain the proper record. There is no central authority under which all existing ULS sites may be automatically searched. Consequently, an exhaustive search of all available ULS sites is currently required. Worse yet, there is no current mechanism by which an application can determine the total set of ULS sites on a given day. Thus, newly added sites only further complicate an effort to locate a user having an unknown ULS connection.

As to the lack of static device identifiers, one Internet faxing service incorporates reversed fax numbers in email message addresses. This service, however, sends email-based messages to a fax machine at a constant, known number where the fax machine may consistently be found. It does not provide a scalable solution for locating and connecting to intermittently connected devices.

Thus, prior art systems fails to provide users with a static identifier which may be resolved to gain access to an intermittently connected device. This lack of a single identifier complicates the process of determining the network address (if any) of a device which is intermittently connected or for other reasons not permanently assigned a network address. As a result, location of and communication with such non-permanent devices is unduly burdensome using prior art techniques.

SUMMARY

According to one embodiment of the present invention, a method of providing access to a device intermittently connected to a network is described. A dynamic database address including a static identifier for the device is used to log on to a particular dynamic database. The dynamically assigned network address of the device is provided to the dynamic database such that the dynamic database can return the appropriate dynamically assigned network address corresponding to the static identifier when resolution of the static identifier is requested.

According to another embodiment of the present invention, a system including a network, an intermittently connected device, and a dynamic database server is described. The device has a static identifier and an assigned network address. The dynamic database server stores the static identifier and the assigned network address when the intermittently connected device sends a log on request to the database server.

According to another embodiment, a system including a processor and a memory containing a dynamic database program and a name server interface program is described. The name server interface program passes requests to resolve machine names including static identifiers to the dynamic database program.

BRIEF DESCRIPTION OF THE FIGURES

The present invention is illustrated by way of example and not limitation in the figures of the accompanying drawings.

DETAILED DESCRIPTION

The present invention provides a technique for translating a convenient static identifier number into a dynamically assigned network address. In the following description, numerous specific details such as particular static identifiers, domain subdivisions, and name resolution protocols are set forth in order to provide a more thorough understanding of the present invention. It will be appreciated, however, by one skilled in the art that the invention may be practiced without such specific details.

One embodiment of the present invention allows a device to maintain a static identifier or a "friendly name" even though the device is dynamically assigned a network (e.g., IP) address. This allows other users to locate and access the device using existing standard scalable communication techniques (e.g., DNS name resolution). Prior art techniques do not provide such a mechanism for locating and accessing intermittently connected devices.

Figure 1:
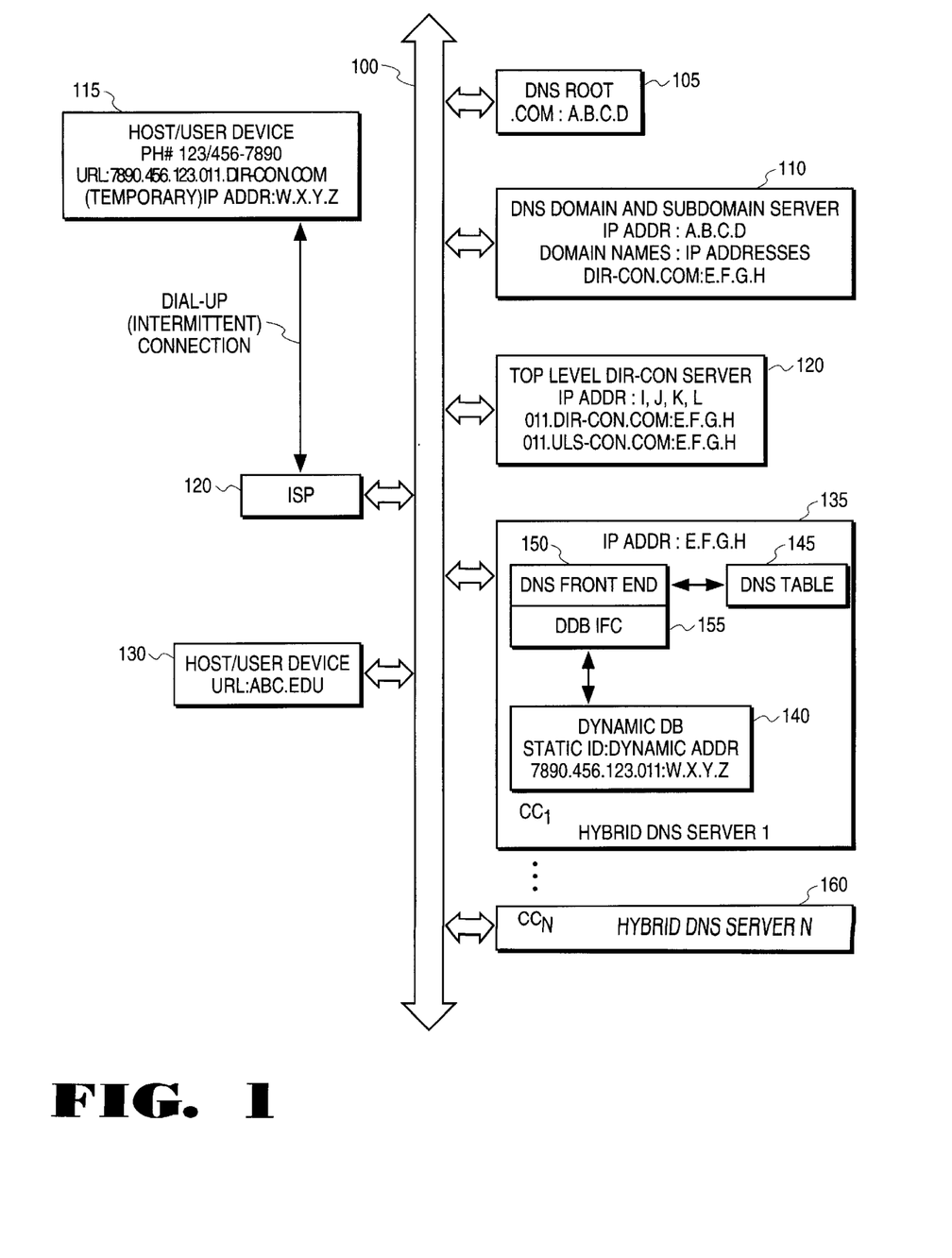
FIG. 1 illustrates one embodiment of a system of the present invention.

For example, in the system of FIG. 1, one embodiment of the present invention allows a caller (device 130) to contact an intermittently connected device 115 (callee) using a static identifier. In one embodiment, the intermittently connected device 115 is a personal computer which is connected to the Internet 100 using a dial-up connection through an Internet service provider 120. The Internet service provider 120 assigns a temporary IP address (W.X.Y.Z) to the personal computer.

When a phone number is used as the static identifier, the calling device 130 can use that phone number to access the device 115 by rearranging the phone number into a predefined format to form the host portion of a universal resource locator (URL) such as 7890.456.123.011.dir-con.com. The use of an identifier in a predefined format as a variable portion of a URL under a fixed domain such as dir-con.com allows a single scalable name resolution system to perform the necessary URL translations. The remainder of the system illustrated in FIG. 1 performs the translation to provide the device 130 with the dynamically assigned IP address W.X.Y.Z such that the calling device 130 may gain access to the device 115.

This embodiment advantageously utilizes the DNS system to resolve the URL for the intermittently connected device 115, thereby allowing software executed on the calling device 130 to access the device 115 as it does any other device identified by a URL. Thus, existing applications such as web browsers may be used to access devices intermittently connected to the Internet.

The existing DNS system hierarchically resolves the host portion of URL addresses into IP addresses. Each designation in a domain name extending to the left of a period is a subdomain of the domain to the right of that period. An implicit period at the end of each domain name makes all domains subordinate to the root domain ("."). A hostname server 105 acts as a DNS root server and provides IP addresses for top level domain servers such as the servers for the .org, .net, .edu, .gov, and .com domain names. For example, the server 105 may contain the information that the .com domain server has the IP address of A.B.C.D. Notably, many servers across the Internet may contain the top level or root domain information. Operation of such hostname or DNS servers is well known in the art.

Assuming that the URL for the intermittently connected device 115 is not cached, the calling device 130 at URL abc.edu hierarchically resolves the IP address for the callee device 115. First, a .edu server (not shown) is queried to determine whether it can resolve 7890.456.123.011.dir-con.com. Since the .edu server does not contain addresses for .com domain machines (unless cached), it is unable to resolve this address, and the server 105 containing the DNS root information is next contacted. This server points to the .com domain server at IP address A.B.C.D. At least the .com domain server and possibly a number of subdomain servers are then contacted to reach a direct connection (dir-con) domain which ultimately provides the IP address (W.X.Y.Z) of the device 115.

As shown, the server 110 contains the IP address I.J.K.L for a top level dir-con server 120 which contains DNS entries for subdomains of the dir-con domain name. The top level dir-con server 120 contains the IP address E.F.G.H for a hybrid DNS server 135 which services the 011 country code. Additionally, the server 120 contains an IP address for the locator server at 011.uls.dir-con.com which devices from the 011 country code contact when logging in. In the illustrated embodiment, the locator server is a program run on the hybrid DNS server 135.

The hybrid DNS server 135 includes a DNS front end 150 which provides standard DNS resolution functions for IP addresses stored in a DNS table 145. This DNS front end acts as a hostname server such as the standard DNS server 110. The DNS table 145 stores IP addresses for machines which have permanent IP addresses or at least which do not log on and off using different IP addresses.

The hybrid server 135 differs from prior art servers in that it also includes a dynamic hostname database 140 which stores IP addresses temporarily assigned to intermittently connected machines. Devices logging in contact the dynamic database using a dynamic database identifier (e.g., uls.dir-con.com) to store their temporary IP addresses in the dynamic database 140. Since the name of the proper dynamic database is a predefined combination of the dynamic database indicator ("uls") and a phone number for the intermittently connected device, the intermittently connected device 115 (or its user) need not arbitrarily choose a user locator service as done in the prior art. Although any other dynamic database identifier may be used, it may be appropriate to use "uls" since the dynamic database system may perform functions previously associated with ULS servers.

When a device requests that the hybrid DNS server 135 resolve a machine name for an intermittently connected device, the dynamically assigned IP address is not found in the DNS table 145. As a result, the DNS front end 150 communicates with the dynamic database interface 155 and queries the dynamic database 140 to determine if an IP address for the requested machine is stored in that database. Alternately, the DNS front end may recognize accesses to the direct connection domain and relay them to the dynamic database interface 155.

In another alternate embodiment, a hybrid server only maintains entries for intermittently connected devices under the predetermined (dir-con) domain. This eliminates the need to separately maintain a DNS table for other devices. Such tables, however, are commonly maintained at least as part of a caching scheme. If no DNS table is maintained, the DNS front end passes requests directly to a dynamic database resolve routine.

Figure 2:
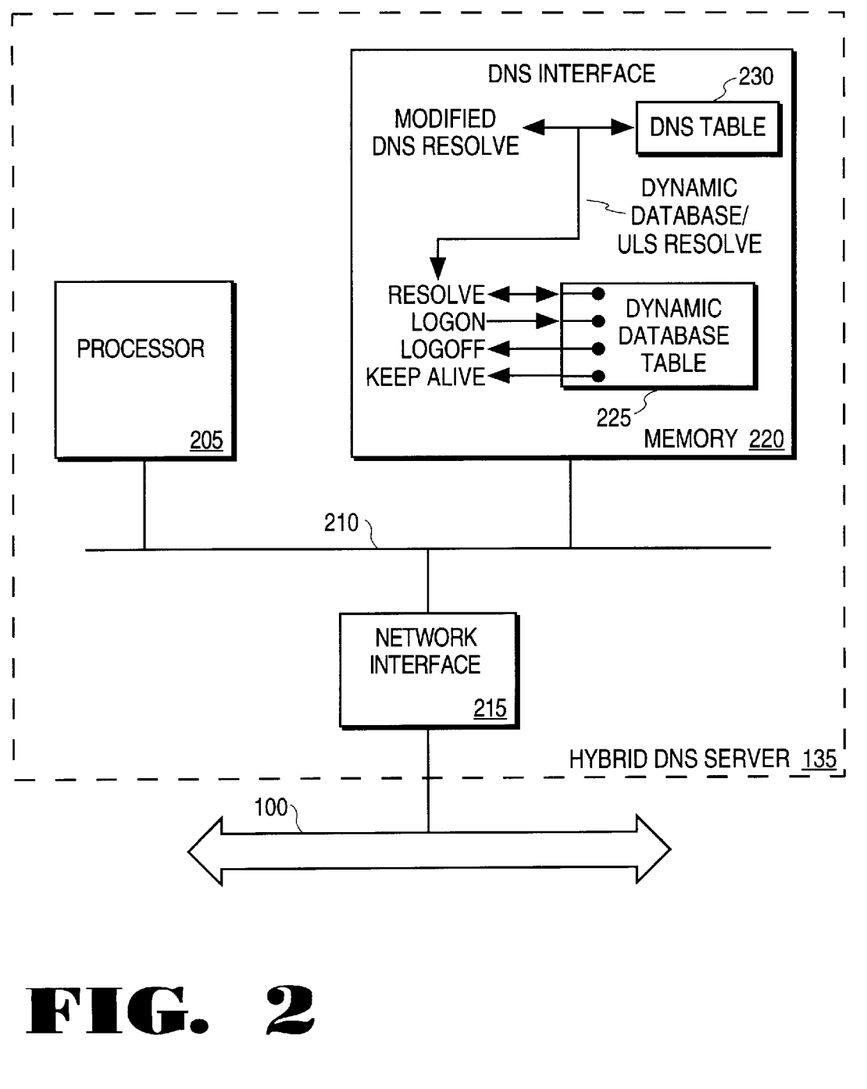
FIG. 2 illustrates one embodiment of a hybrid DNS server configured according to the present invention.

FIG. 2 illustrates several further details of the hybrid DNS server 135 shown in FIG. 1. A network interface 215 provides communication between an internal bus 210 and the Internet 100, thereby allowing name resolution requests to be received. A processor 205, which may be embodied in one or more discrete components or integrated circuits, executes commands and routines stored within a memory 220. The memory 220 contains a DNS interface including a modified DNS resolve routine.

The DNS resolve routine is modified so that if the standard DNS resolution using a DNS table 230 fails, the routine then calls a dynamic database or ULS resolve routine. The dynamic database resolve routine returns an IP address if one is stored in the dynamic database table 225 for the requested static identifier. If there is no entry for that static identifier, an error signal is returned.

A log on routine is called when a device accesses an appropriate uls.dir-con.com subdomain as a part of logging on to the Internet. The hybrid DNS server receives a static identifier and a dynamically assigned address from the device and stores the static identifier and the dynamically assigned IP address in the dynamic database table 225. Conversely, a log off routine removes such an entry from the dynamic database table 225 when a device indicates that it is logging off of the Internet. Finally, a keep-alive routine determines whether a device has sent a keep-alive signal to the hybrid DNS server 135 within a predetermined duration. If the predetermined duration has passed without a keep-alive signal, the server times out the connection and removes the entry from the database 225.

Returning now to FIG. 1, a number of such hybrid DNS servers will typically be supplied. The server 135 services a first country code such as 011 for the United States. Thus, server 135 handles all requests under 011.dir-con.com. Similarly, where CCN is the nth country code, the server 160 handles all requests under a CCN.dir-con.com domain name. In this manner, phone numbers may be partitioned by country code.

One great advantage of this system is that scaling is possible by further dividing the dir-con domain into further subdomains. For example, a hybrid DNS server may serve each area code rather than each country code. In this case, an entry in either the top level server 120 or a server hierarchically beneath the top level server contains the IP address of a hybrid DNS server which services an area code subdomain such as 123.011.dir-con.com. The hybrid server then contains the dynamic database storing IP addresses for any users logged in within the 123 area code. Initially, multiple area codes may be serviced by a single name server; however, when a server becomes overloaded, the entries for one or more area codes may be off-loaded to other name servers by changing the DNS entries for the off-loaded area code(s).

This system allows expansion of the number of servers performing translations to IP addresses, thereby allowing number of users to increase. Additionally, this scaling is transparent because DNS name resolution navigates through the hierarchy and properly provides the needed IP address regardless of the number of levels of hierarchy. This scaling may continue by further dividing the dir-con domain using the remaining digits of the phone number and by providing hybrid DNS servers at a lower level. If the next three digits of the phone number are used to specify a hybrid server's URL, only the final four digits or a maximum of ten thousand static identifiers may need to be stored by each server. Finally, however, additional digits may be added as a prefix if it is desirable to address multiple devices at a particular phone number (e.g., use a URL such as 0.7890.456.123.011.dir-con.com). Alternately, phone numbers could be separated into different subdomains by adding or moving the periods in the URL. The exact partitioning technique is not crucial and other methods fall within the scope of the present invention.

Figure 3:
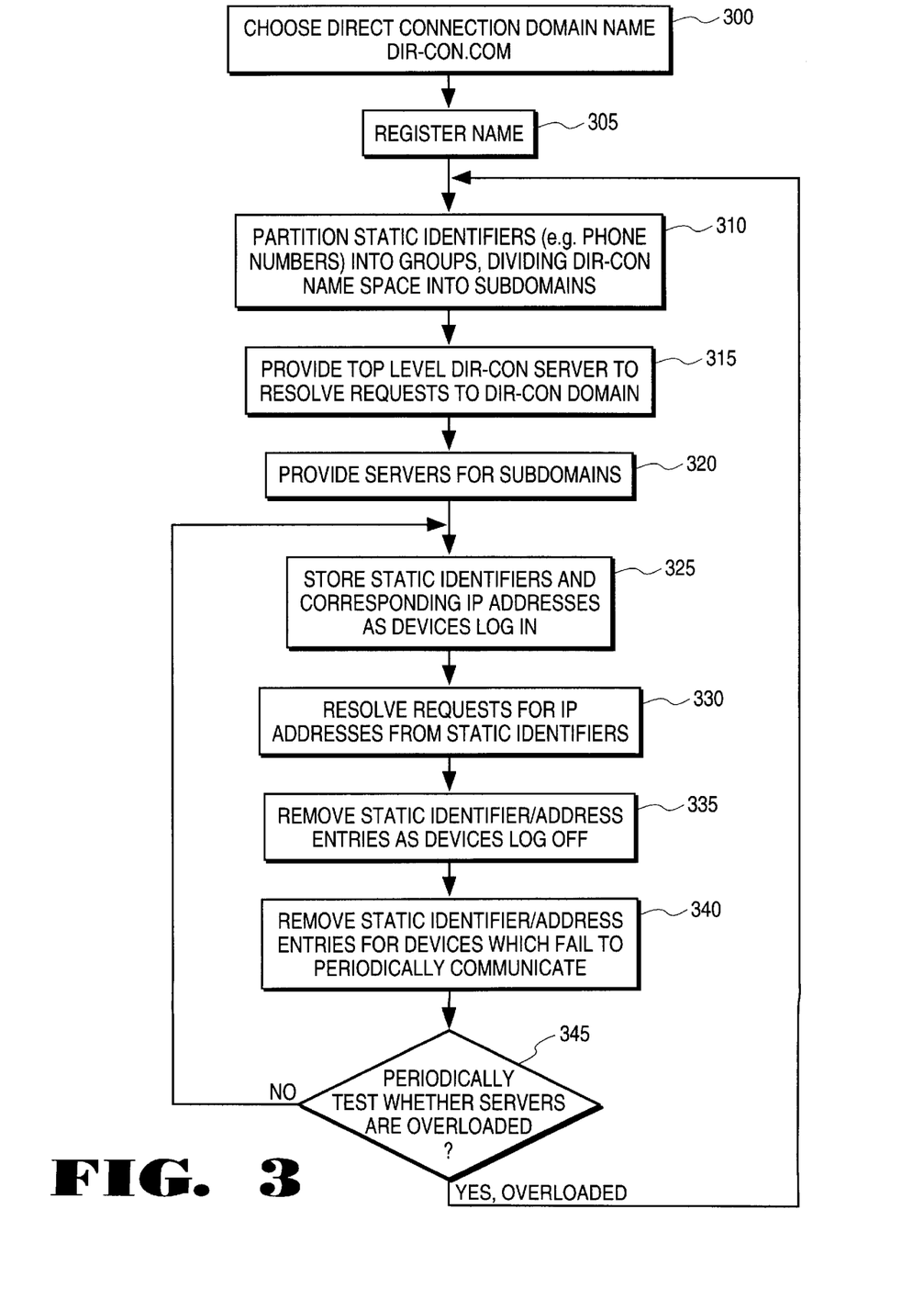
FIG. 3 illustrates a method of establishing a name resolution system according to one embodiment the present invention.

FIG. 3 illustrates one embodiment of a method of establishing a system such as that in FIG. 1 to resolve static identifiers using the domain name system. First, a name such as dir-con.com is chosen for the direct connection domain name as shown in step 300. Domain names are presently registered, as indicated by step 305, by contacting the Internic registration service at http://rs.internic.net. This registration results in the dir-con domain name being placed in a server under the .com domain. For example, the direct connection domain name and its corresponding IP address are stored in the server 110 shown in FIG. 1.

Next, as shown in step 310, the phone numbers are divided into groups which split the direct connection name space into subdomains. As previously mentioned, this subdivision may be done at the level of country code, area code, exchange, or further divisions of the digits of the phone number. Once the name space is divided, servers may be provided for subdomains as shown in step 320. For example, in FIG. 1, the direct connection domain space is divided into subdomains of country codes. One of the DNS servers 110 contains the IP address (I.J.K.L) for the top level dir-con server 120. This server in turn contains the IP address (E.F.G.H) for the hybrid DNS server 135 which services the 011 country code subdomain. Other country code subdomains also have their own servers or share servers depending on the utilization of the particular subdomain.

Once the domain and subdomain servers are established, the system may begin operation. As devices log into the system, their static identifiers and corresponding IP addresses are stored in the appropriate subdomain hybrid DNS server as shown in step 325. The hybrid DNS servers also resolve requests for IP addresses from static identifiers as shown in step 330.

Finally, machines may be logged off of the system in one of two ways. First, as shown in step 335, entries of the static identifier and corresponding address are removed if the device explicitly sends a signal indicating that it is logging off of the system. Additionally, as shown in step 340, if the devices do not periodically communicate with the server storing the IP address and identifier for that device, the device will be deemed disconnected and its entry removed from the server. Notably, steps 325–340 may occur independently and in a different order than shown. The sequence of these events depends on the requests received by a particular server and the amount of time elapsing.

To take advantage of the scalability of this system, tests should periodically be performed to determine whether servers are overloaded. These tests may be performed manually or in an automated fashion by determining how many different devices log on to and log off of each subdomain server. If the load on that subdomain server is too high, the method returns to step 310 where the static identifiers may be re-partitioned to spread the load over an increased number of servers. If the system is not overloaded, the system continues operating by returning to step 325.

Figure 4:
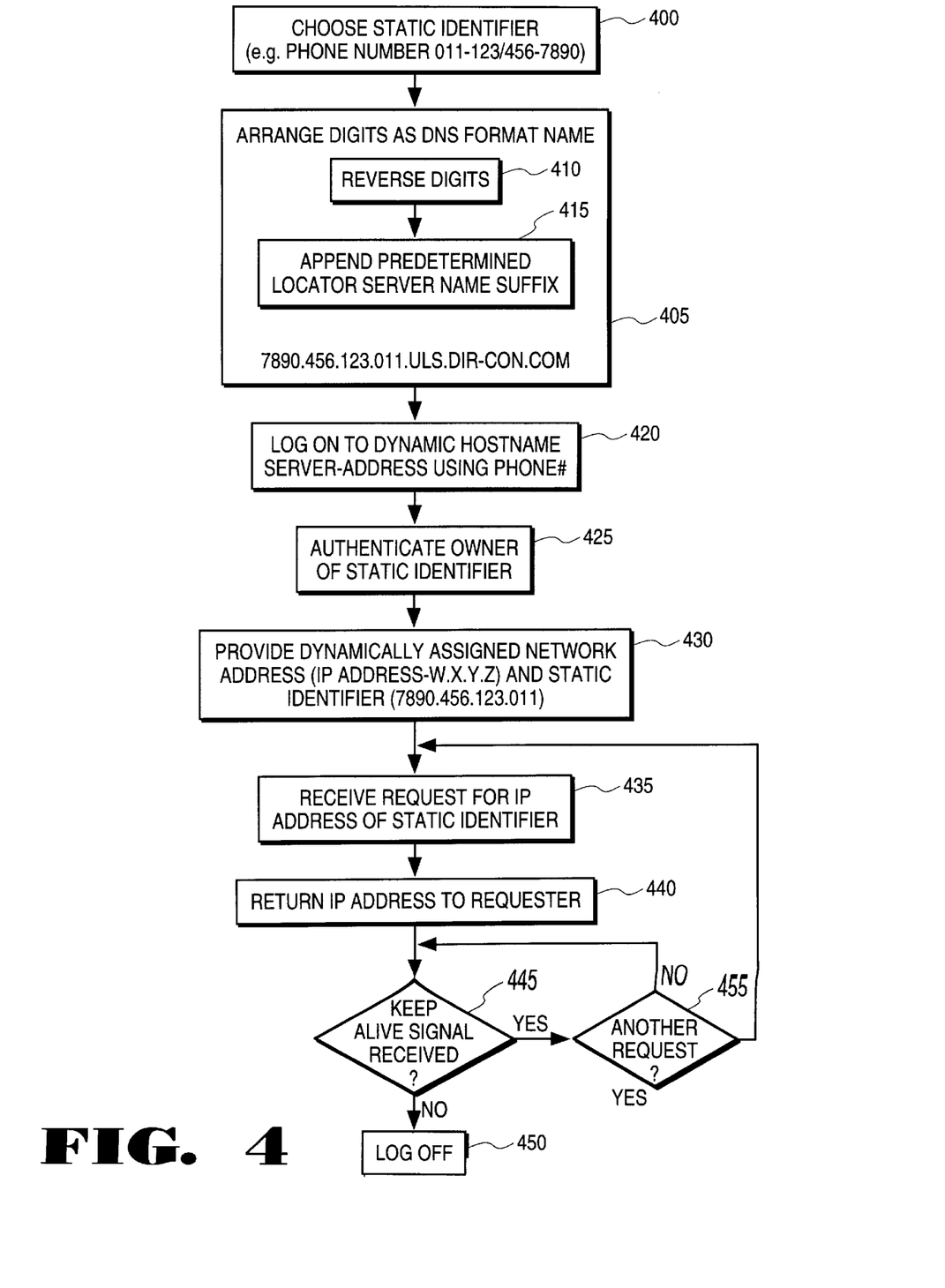
FIG. 4 illustrates one embodiment of a method by which a device may connect to a network and allow access by other devices according to the present invention.

Once the system is set up, through a combination of actions by the host device and a hybrid DNS servers, the device may connect to the system using the procedure shown in FIG. 4. First, as shown in step 400, a static identifier such as the phone number 011-123/456-7890 is chosen by the device. In step 405, this phone number is rearranged to form a DNS formatted name. First, in step 410, the digits of the phone number are reversed, resulting in the least specific digits (i.e., the country code) being closest to the end of the device name. In general, DNS names are resolved from right to left with the highest hierarchical or least specific portion of the name being furthest on the right. Thus, reversing a phone number to form a domain name results in domain subdivision roughly based on geographical location.

After the reversed digits of the phone number, a predetermined locator server name suffix is appended as shown in step 415. For example, the suffix "uls" may be appended, followed by the direct connection domain name. The name formed is the name of a dynamic host name server such as the hybrid DNS server 135 in FIG. 1. The locator server suffix "uls" indicates that a device is addressing the dynamic database routines to perform a function such as logging on rather than attempting to resolve an IP address.

In step 420, the device logs on to the dynamic database. An authentication process is performed in conjunction with logging on to the system to prevent unauthorized devices from receiving communications. Without authentication, a device could provide any phone number it wished and mimic another device which actually has that phone number. As a result, unauthorized communications could occur.

When authentication is performed, a secure link is established between each server in the hierarchy between the device logging on and the hybrid DNS server. As is known in the art, this secure link can be used to exchange a digital certificate which verifies that information has been transmitted without tampering, thus allowing a device's identity to be authenticated.

Next, as shown in step 430, the dynamically assigned IP address and the static identifier are sent to the hybrid DNS server. For example, in the system illustrated in FIG. 1, the IP address of W.X.Y.Z and the static identifier of 7890.456.123.011 are transmitted by the device 115 to the hybrid DNS server 135 and stored in the dynamic database 140.

Once the address and static identifier are stored in the dynamic database 140, the dynamic database can service requests for this address. From step 435, where such a request is received, the remaining steps of FIG. 4 may be performed by a hybrid DNS server such as the server 135 illustrated in FIG. 1. A request includes the static identifier associated with that address. The DNS front end 150 checks the DNS table 145 using a first resolve routine, and then passes the request to the dynamic database interface 155 which uses a second resolve routine to access the dynamic database. The server 135 then returns the proper IP address to the requester as shown in step 440.

As time elapses, the server 135 periodically will check whether the device 115 has sent a keep-alive signal to maintain communication with the server as illustrated in step 445. If no keep-alive signal has been received after a predetermined duration, the server 135 will log the device off as shown in step 450. The duration is typically tracked by a timer and may be adjusted to compensate for usage loads or server capabilities.

If the keep-alive signal is regularly received from the device 115, the server will continue to service requests for that device's IP address. Thus, as shown in step 455, if another request is received, the method returns to step 435 which results in the return of an IP address to satisfy that request. If no further requests are received, the server continues to verify that the device 115 is transmitting keep-alive signals. Notably, the server may execute steps 445 and 455 in response to interrupt signals generated by timers or incoming requests rather than looping between these steps.

Figure 5:
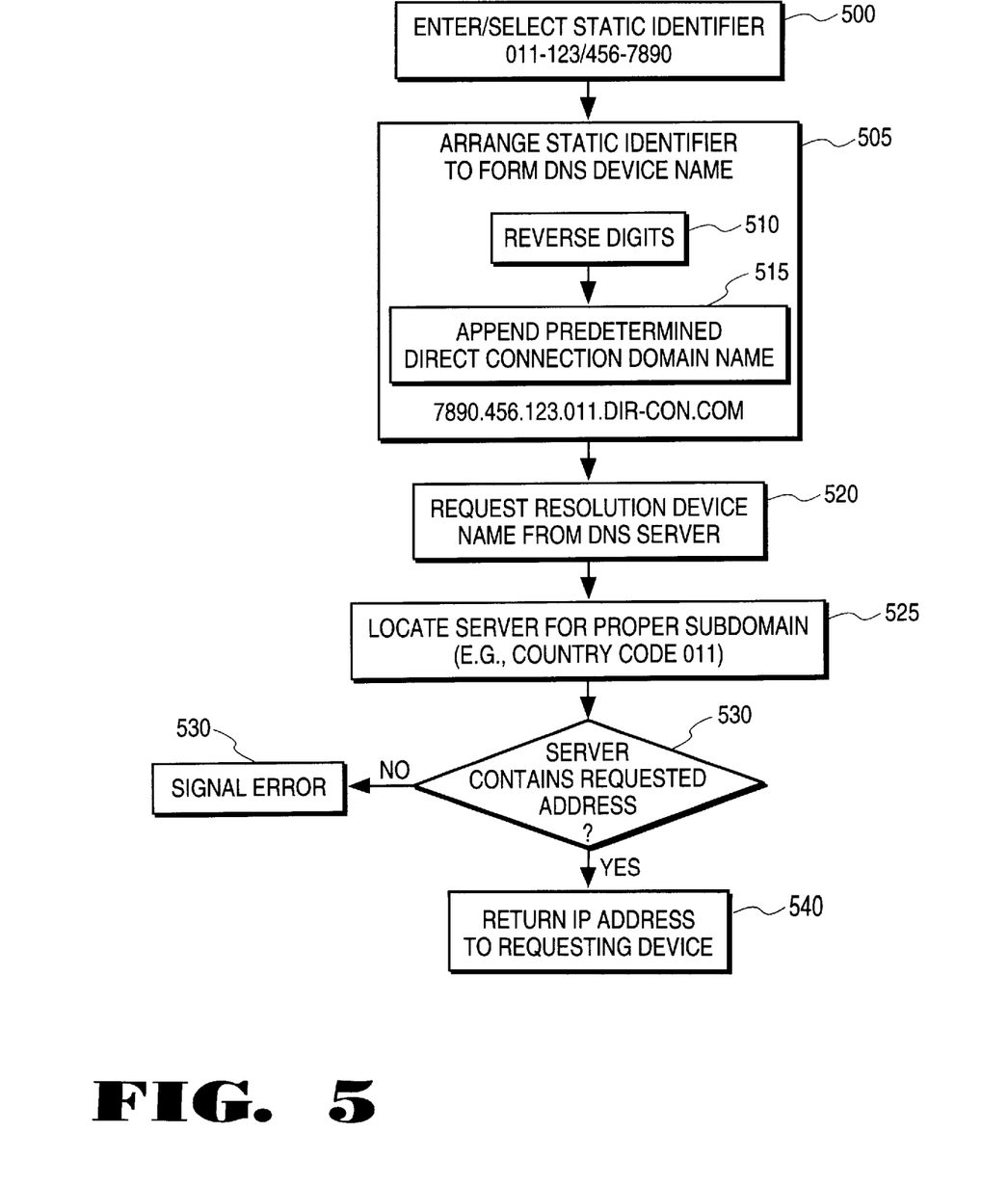
FIG. 5 illustrates one embodiment of a method by which a device may gain access to an intermittently connected device according to the present invention.

Once the intermittently connected device 115 is logged on, and the server 135 is servicing requests for IP addresses, another device may achieve communication with the intermittently connected device 115 according to the process shown in FIG. 5. For example, the device 130 at abc.edu may contact the device 115 at 7890.456.123.011.dir-con.com. First, as shown in step 500, a static identifier is either entered into or selected by the device 130. A user may enter or select this value, or the device may select the static identifier from a storage location.

The static identifier is arranged to form a device name in DNS format as shown in step 505. In the case of a phone number, this is accomplished by reversing the digits of the phone and appending a predetermined direct connection domain name as illustrated in steps 510 and 515. The resulting device name in DNS format is 7890.456.123.011.dir-con.com. Unlike the logging in stage, no locator server indicator ("uls") is included in the name because the device 130 simply wishes to access the intermittently connected device 115.

Accordingly, resolution of this device name is requested from a DNS server in step 520. After step 520, the remaining steps of FIG. 5 are performed by DNS servers. Since the device 130 is located under the .edu domain, several levels of hierarchy may need to be traversed prior to locating the server 110 which contains the IP address of the hybrid DNS server 135. This IP address, E.F.G.H, is resolved, and the server 135 is accessed using standard DNS resolve procedures because the DNS front end 150 provides the interface of a standard DNS server. Thus, as illustrated in step 525, the IP address of the server 135 is returned because that server serves the country code (011) indicated by the phone number used.

As shown in step 530, the server 135 determines whether it contains the requested IP address. This is accomplished in this embodiment by first testing the DNS table 145, and then, if the DNS table 145 does not contain the address, passing the request to the dynamic database interface 155 to check whether the appropriate entry is stored in the dynamic database 140. If the IP address is not present, an error is signaled as shown in step 535. The error returned to the device 130 indicates that the requested device is not available, as would occur if a permanently connected device was off-line or otherwise unable to service requests.

If the IP address is present in the server 135, the proper address is resolved and returned to the requester as shown in step 540. Thus, the requesting device, device 130, receives the IP address for the intermittently connected device. Subsequently, the device 130 can access the intermittently connected device 115 with the IP address without ever needing to know that the intermittently connected device is not permanently assigned an IP address.

Thus, the method and apparatus of the present invention provides a technique for using the Internet domain name system to translate a static identifier into a host computer's dynamically assigned Internet address. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:

logging a device on to a dynamic database using a dynamic database address comprising a static identifier which is a phone number for said device arranged in a predetermined format with a predetermined static appended portion; and returning a dynamically assigned network address corresponding to said device to a requesting device when resolution of said dynamic database address is requested from the and that the dynamic database.

2. The method of claim 1 wherein said predetermined static appended portion is a predetermined domain name.

3. The method of claim 1 wherein the dynamic database address comprises said phone number arranged into a domain name.

4. The method of claim 3 wherein a plurality of digits in said phone number are reversed.

5. The method of claim 4 wherein the dynamic database address consists of said static identifier and a predetermined dynamic database server name which is the predetermined static appended portion.

6. The method of claim 1, after logging on, further comprising authenticating that said device corresponds to said static identifier.

7. A method comprising:
selecting a static identifier which is a phone number for a device;
deriving a name in a first format from said static identifier for said device by arranging a plurality of digits in said phone number to form a device name comprising a plurality of subdomain names arranged in a predetermined format with a static appended portion; and
contacting a dynamic database server using said name.

8. The method of claim 7 wherein contacting said dynamic database server comprises:
requesting entry into a dynamic database of a dynamically assigned network address that corresponds to said name.

9. The method of claim 7 wherein the step of arranging comprises the step of reversing said plurality of digits in said phone number.

10. The method of claim 7 further comprising:
requesting resolution of said name;
receiving a resolved network address corresponding to said device in response to the step of requesting resolution of said name; and
accessing said device using said resolved network address.

11. The method of claim 10 wherein the step of requesting comprises the step of sending said static identifier to a domain name system server.

12. A method of using an Internet domain name system to translate a static identifier into a host device address, comprising the steps of:
providing a plurality of servers, each of said plurality of servers having a hostname space capable of storing a plurality of static identifiers which are phone numbers and a plurality of corresponding network addresses;
receiving a request for a network address given a domain name service name, said static identifier being included in said domain name service name;
locating one of said plurality of servers storing said requested static identifier and a corresponding network address by using the Internet domain name system to resolve the host device address from a host name comprising said static identifier arranged in a predetermined format with a static appended portion; and
returning said corresponding network address as said host device address.

13. The method of claim 12 wherein the step of locating comprises the steps of:
resolving an Internet Protocol address for a dynamic database server storing said static identifier and said corresponding network address; and
resolving said corresponding network address from a table of dynamic hostname entries.

14. The method of claim 12, after the step of providing, further comprising the step of storing a table containing a plurality of phone numbers and a plurality of corresponding Internet Protocol addresses.

15. The method of claim 14 wherein the step of receiving comprises the step of receiving a domain name system formatted name including a phone number and a direct connection domain name.

16. The method of claim 12 wherein the step of locating comprises the step of sending said static identifier to at least one domain name server.

17. A system comprising:
a network;
a device intermittently connected to the network, said device having a name comprising a static identifier which is derived from a user telephone number arranged in a predetermined format with a static appended portion, the device also having a dynamically assigned network address when connected to the network;
a dynamic database server coupled to said network, said dynamic database server receiving a log on request from said device when said device connects to said network and storing said dynamically assigned network address and said name.

18. The system of claim 17 wherein said dynamic database server includes a resolve routine to return the dynamically assigned network address of the device intermittently connected to the network if the name is stored in said dynamic database server.

19. The system of claim 17 further comprising a hostname server storing a table including a plurality of device identifiers and a plurality of corresponding network addresses, and wherein said hostname server requests a translation from said dynamic database server if a requested name is not found in said plurality of device identifiers.

20. The system of claim 19 wherein said dynamic database server returns an error if said device is not logged in and wherein said dynamic database returns said network address if said device is logged on.

21. The system of claim 19 wherein said hostname server and said dynamic database server are two tasks executed on a hybrid DNS server machine.

22. The system of claim 17 wherein said device transmits said log on request to said dynamic database server using said static identifier in conjunction with a predetermined dynamic database server indicator to form a dynamic database server name.

23. The system of claim 22 wherein said dynamically assigned network address comprises an IP address, and further wherein said dynamic database server name is also derived from said user telephone number.

24. The system of claim 23 wherein said name comprises an arrangement of a plurality of digits in said user phone number concatenated with a direct connection domain name, and wherein said dynamic database server address comprises said arrangement of said plurality of digits in said user phone number concatenated with said predetermined dynamic database server indicator concatenated with said direct connection domain name.

25. A system comprising:

a processor;

a memory coupled to the processor, said memory containing therein:

- a dynamic database program including a resolve routine for resolving requests for dynamically assigned network addresses when given device names comprising static identifiers which are phone numbers arranged in a predefined format with a predetermined domain name appended; and
- a name server interface program which passes requests to resolve a machine name including a static identifier to said dynamic database program.

26. The system of claim 25 wherein said dynamic database program further includes:

- a log on routine which receives a first static identifier and a first dynamically assigned network address from an intermittently connected device and stores said first static identifier and said first dynamically assigned network address in a dynamic database table used by said resolve routine; and
- a log off routine which removes said first static identifier and said first dynamically assigned network address from said dynamic database table when said intermittently connected device logs off.

27. The system of claim 26 wherein said dynamic database program further includes a keep-alive routine which determines whether said intermittently connected device has sent a keep-alive signal to said system, said keep-alive routine maintaining said dynamic database table if said keep-alive signal has been sent within a predetermined duration, said keep-alive routine removing said first static identifier and said first dynamically assigned network address from said dynamic database table if said keep-alive signal has not been sent in said predetermined duration.

* * * * *

UNITED STATES PATENT AND TRADEMARK OFFICE
CERTIFICATE OF CORRECTION

PATENT NO. : 5,974,453
DATED : October 26, 1999
INVENTOR(S) : Andersen et al.

It is certified that error appears in the above-identified patent and that said Letters Patent is hereby corrected as shown below:

<u>Column 9, claim 1,</u>
Line 7, delete "the and that".

Signed and Sealed this

Nineteenth Day of March, 2002

Attest:

Attesting Officer

JAMES E. ROGAN
*Director of the United States Patent and Trademark Office*